United States Patent
Crockett et al.

(10) Patent No.: US 9,542,277 B2
(45) Date of Patent: Jan. 10, 2017

(54) HIGH AVAILABILITY PROTECTION FOR ASYNCHRONOUS DISASTER RECOVERY

(71) Applicant: International Business Machines Corporation, Armonk, NY (US)

(72) Inventors: Robert N. Crockett, Tucson, AZ (US); Eduard A. Diel, Tucson, AZ (US); Lisa J. Gundy, Tucson, AZ (US); David M. Shackelford, Tuscon, AZ (US)

(73) Assignee: International Business Machines Corporation, Armonk, NY (US)

(*) Notice: Subject to any disclaimer, the term of this patent is extended or adjusted under 35 U.S.C. 154(b) by 149 days.

(21) Appl. No.: 14/501,187

(22) Filed: Sep. 30, 2014

(65) Prior Publication Data

US 2016/0092314 A1 Mar. 31, 2016

(51) Int. Cl.
*G06F 11/00* (2006.01)
*G06F 11/14* (2006.01)
*G06F 11/20* (2006.01)

(52) U.S. Cl.
CPC ....... *G06F 11/1469* (2013.01); *G06F 11/2058* (2013.01); *G06F 11/006* (2013.01); *G06F 11/1448* (2013.01); *G06F 11/2074* (2013.01); *G06F 11/2076* (2013.01); *G06F 2201/825* (2013.01); *G06F 2201/84* (2013.01)

(58) Field of Classification Search
CPC combination set(s) only.
See application file for complete search history.

(56) References Cited

U.S. PATENT DOCUMENTS

| 5,363,487 A * | 11/1994 | Willman ........... G06F 17/30067 707/E17.01 |
| 6,145,094 A | 11/2000 | Shirriff et al. |
| 7,512,835 B2 | 3/2009 | Bartfai et al. |
| 7,555,673 B1 * | 6/2009 | Kelkar ................ G06F 11/2033 714/11 |
| 7,669,080 B2 | 2/2010 | Lind et al. |
| 8,370,679 B1 | 2/2013 | Gawali et al. |
| 2002/0093679 A1 * | 7/2002 | Brady ...................... G06T 9/00 358/1.15 |
| 2005/0149548 A1 * | 7/2005 | Chong, Jr. .......... G06F 11/1466 |

(Continued)

FOREIGN PATENT DOCUMENTS

EP 1039384 A2 * 9/2000 ............. G06F 9/526

OTHER PUBLICATIONS

Clitherow, D., et al. "Combining high availability and disaster recovery solutions for critical IT environments". IBM Systems Journal, vol. 47, No. 4, 2008. pp. 563-575.

*Primary Examiner* — Amine Riad
(74) *Attorney, Agent, or Firm* — John W. Hayes; William H. Hartwell (57) ABSTRACT

A computer-implemented method, carried out by one or more processors, for a modified asynchronous replication session. In an embodiment, the method comprises the steps of acquiring a lock on a volume configuration, where the lock prevents changes to the volume configuration between a first volume and a second volume at a remote site. Internal control block information is updated, where the update includes at least a volume serial number of the first volume matching a volume serial number of the second volume. Responsive to updating internal control block information, the acquired lock is released to allow changes to the volume configuration.

12 Claims, 4 Drawing Sheets

(56) References Cited

U.S. PATENT DOCUMENTS

| | | | |
|---|---|---|---|
| 2005/0149683 A1* | 7/2005 | Chong, Jr. | G06F 11/1466 |
| | | | 711/162 |
| 2006/0206677 A1* | 9/2006 | Kim | G06F 3/0611 |
| | | | 711/162 |
| 2008/0061138 A1* | 3/2008 | Fisher | G11B 23/042 |
| | | | 235/382 |
| 2011/0145497 A1 | 6/2011 | Bish et al. | |

* cited by examiner

HIGH AVAILABILITY PROTECTION FOR ASYNCHRONOUS DISASTER RECOVERY

BACKGROUND

In the present day, High Availability (HA) solutions provide the ability to recover from storage failures at a production site, while Disaster Recovery (DR) solutions provide the ability to recover from regional disasters. Combining the two solutions, High Availability and Disaster Recovery, allow for a more comprehensive coverage of production data at the production site. However, there are instances where the combination of High Availability and Disaster Recovery may not provide desired coverage during certain failure modes. In one example of a failure mode, issues related to storage at the Disaster Recovery site may result in a loss of Disaster Recovery protection. In another example, after performing Disaster Recovery, data may not be protected by a High Availability solution.

SUMMARY

Embodiments of the present invention disclose a method, computer program product and computer system for a modified asynchronous replication session. A computer-implemented method, carried out by one or more processors, for a modified asynchronous replication session includes the steps of acquiring, by one or more processors, a lock on a volume configuration, wherein the lock prevents changes to the volume configuration between a first volume and a second volume at a remote site. Internal control block information is updated, wherein the update includes at least a volume serial number of the first volume matching a volume serial number of the second the volume. Responsive to updating internal control block information, the acquired lock is released to allow changes to the volume configuration.

DETAILED DESCRIPTION

Embodiments in accordance with the present invention modify a replication process between a primary site and a secondary site. The secondary site, also known as the disaster recovery site, includes a modified high availability storage. Modifications to the high availability storage ensure that the high availability storage can operate in the disaster recovery site should a secondary storage become compromised. Embodiments in accordance with the present invention acquire a lock on a volume configuration, where the lock prevents changes to the volume configuration between a secondary volume and a high availability volume at a disaster recovery site. The high availability volume at the disaster recovery site supports the secondary volume during instances where the secondary volume becomes unavailable. Embodiments in accordance with the present invention update internal control block information, where the update includes at least a volume serial number of the secondary volume matching a volume serial number of the high availability volume. During the update of internal control block information, the asynchronous minor prevents any errors in the replication of data from the primary site to the secondary site. Responsive to updating internal control block information, embodiments in accordance with the present invention release the acquired lock to allow changes to the volume configuration. The acquired lock prevents a suspension of replication if the secondary volumes become unavailable at any point during the replication session.

Figure 1:
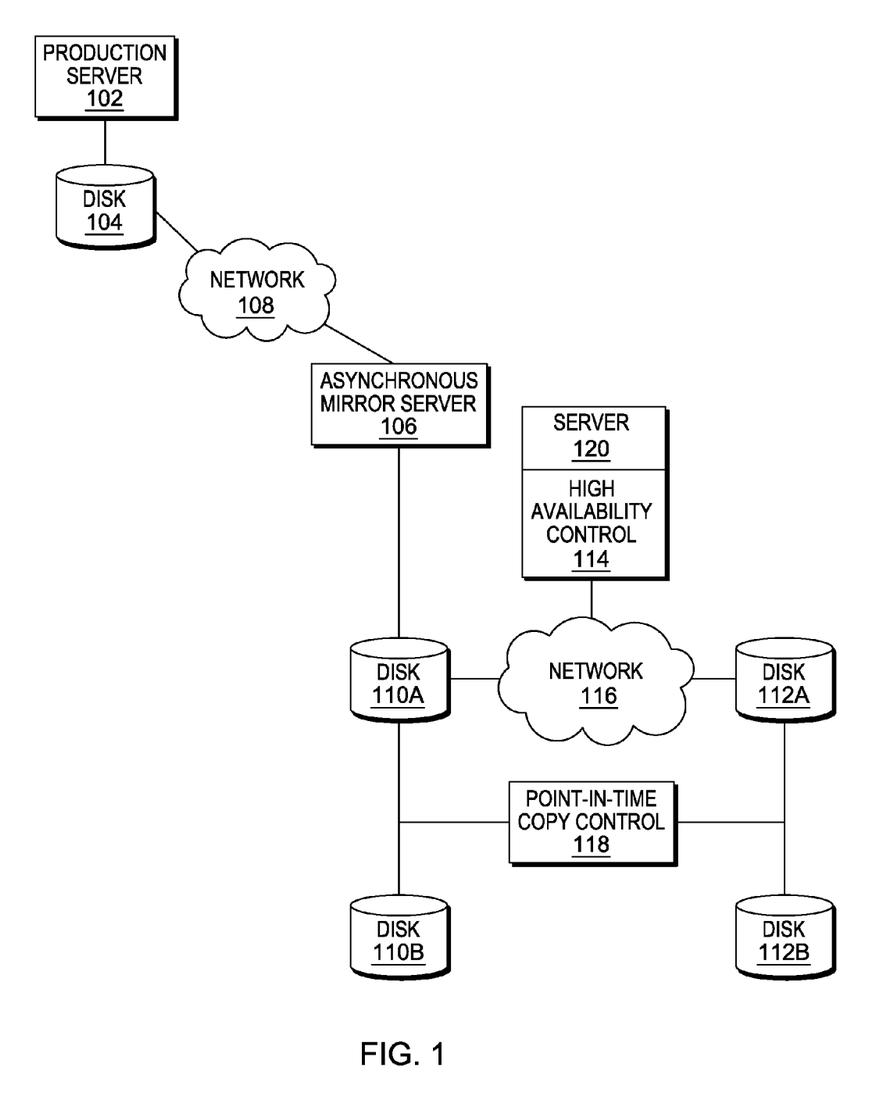
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention.

Either or both production server 102 and server 120 may be a desktop computer, a laptop computer, a tablet computer, a specialized computer server, a smartphone, or any other computer system known in the art. In certain embodiments, production server 102 and/or server 120 may represent a computer system utilizing clustered computers and components that act as a single pool of seamless resources when accessed through a network, as is common in data centers and with cloud computing applications. In general, production server 102 and server 120 are representative of any programmable electronic device or combination of programmable electronic devices capable of executing machine readable program instructions and communicating with other computer devices via a network. In this embodiment, production server 102 is situated in a local site, also known as a production site. Disk 104 located at the production site includes production data which is asynchronously mirrored to disk 110A, in order to provide protection of the production data if a failure were to occur at the production site. This asynchronous minoring of data is part of a replication session, such as an extended remote copy (XRC) process.

Asynchronous minor server 106 may be a desktop computer, a laptop computer, a tablet computer, a specialized computer server, a smartphone, or any other computer system known in the art. In certain embodiments, asynchronous mirror server 106 represents a computer system utilizing clustered computers and components that act as a single pool of seamless resources when accessed through a network, as is common in data centers and with cloud computing applications. In general, asynchronous mirror server 106 is representative of any programmable electronic device or combination of programmable electronic devices capable of executing machine readable program instructions and communicating with other computer devices via a network. In this embodiment, asynchronous minor server 106 is situated in a remote site, also known as a disaster recovery site. Asynchronous minor server 106 provides the asynchronous minoring of the production data on disk 104 to a secondary storage location (i.e., disk 110A).

In general, network 108 can be any combination of connections and protocols that can support communications between disk 104 and asynchronous minor server 106. Network 108 can include, for example, a local area network (LAN), a wide area network (WAN), such as the internet, a cellular network, or any combination of the preceding, and can further include wired, wireless, and/or fiber optic connections. Network 108 connects the production site with the disaster recovery site providing protection of the production data.

Disk 112A is a high availability copy of the data in disk 110A. Disk 112A can provide protection for data in disk 110A in the event of storage issues at the disaster recovery site or when the production data of disk 110A is moved to a new technology. Network 116 can be any combination of connections and protocols that can support communication between disk 110A, disk 112A, and high availability control 114.

High availability control 114, on server 120, provides the operational steps to ensure data consistency protections are not compromised during the utilization of disk 112A as a secondary storage. High availability control 114 includes a modified control block information function, where the function updates internal control block information between a first volume and a second volume at a remote site while the replication session is active. An example of a modified control block information function is a modified REFRESHS function. High availability control 114 can determine if the volumes are in duplex and acquire a lock to prevent configuration changes. In a duplex configuration of volumes, each time data is written on a disk in duplex, a duplicate copy is written on a backup disk as well. High availability control 114 can update secondary information at disk 112A and release the lock upon completion of the update to allow configuration changes to occur. High availability control 114 also includes a modified swapping function, where the modified swapping function provides an uninterrupted switch between the first volume and the second volume at the remote site. As a result of the modified swapping function, there are continuous input/output operations at the remote site. The modified swapping function processes the modified control block information function in the event a replication session is active. An example of a modified swapping function is a modified HyperSwap function.

Disk 110B and disk 112B, respectively, include a point-in-time (PIT) copy of production data on disk 110A and disk 112A. Point-in-time copy control 118 is capable of querying a physical device for serial number information, and comparing serial numbers to configurations of disk 110A and 112A, to determine which of the storages is in duplex in the replication session. Point-in-time copy control 118 can adjust commands to use correct mapping of disk 110A to disk 110B, or disk 112A to disk 112B, depending on which storage is in duplex and can perform a snapshot copy, such as FlashCopy™.

Figure 2:
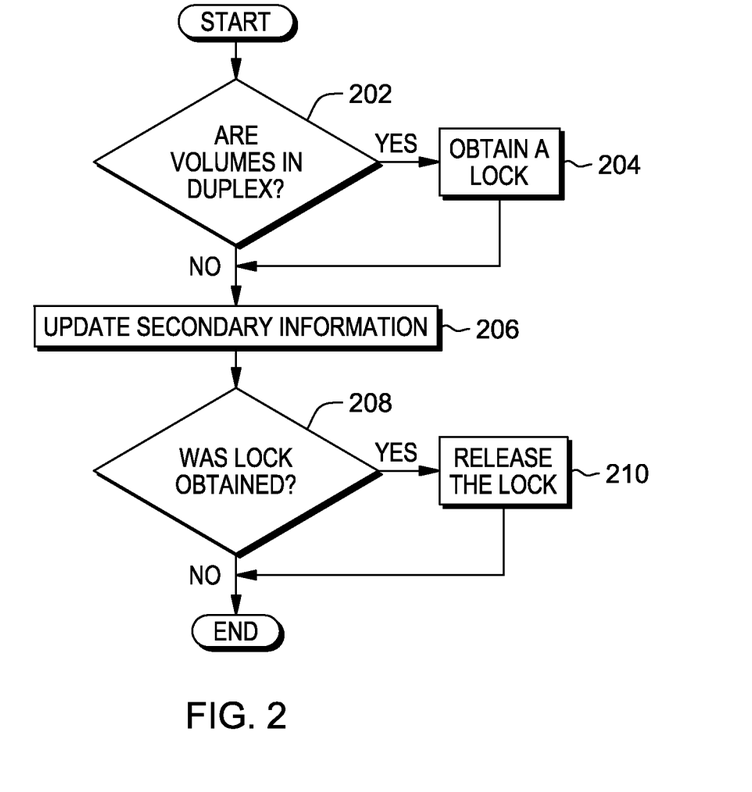
FIG. 2 is a flowchart depicting operational steps of a modified control block information function, running while a replication session is active, in accordance with an embodiment of the present invention.

FIG. 2 is a flowchart depicting operational steps of a modified control block information function running while a replication session is active, in accordance with an embodiment of the present invention.

In this example embodiment, prior to a modified control block information function performing operational steps, high availability control 114 can utilize a modified swapping function to call the modified control block information function. The modified swapping function, operating at the disaster recovery site, can halt application updates and halt the synchronous minor between disk 110A and disk 112A. The modified swapping function can switch the hosting unit control blocks to point to new secondary volumes (i.e., disk 112A) and start application updates at disk 112A. Since the modified swapping function is operating in a disaster recover site, the modified swapping function calls the modified control block information function. High availability control 114 performs the subsequent operating steps of the modified swapping function.

High availability control 114 determines if volumes are in duplex (decision step 202). In this embodiment disk 110A is a secondary volume while disk 112A is the high availability volume. High availability control 114 determines if the volumes of disk 110A are in duplex in the replication session (e.g., Extended Remote Copy). In the event high availability control 114 determines the volumes are in duplex ("yes" branch, step 202), high availability control 114 obtains a lock (step 204). In the event high availability control 114 determines the volumes are not in duplex ("no" branch, step 202), high availability control 114 updates secondary information (step 206).

High availability control 114 obtains a lock (step 204). In this embodiment, high availability control 114 obtains a lock on disk 110A which prevents the configuration from changing. High availability control 114 prevents the addition of volumes pairs or utility volumes and the defining of primary and secondary volumes added to a replication session. High availability protection 110 also prevents the deleting of volume pairs and the suspension of volumes or sessions, where there is one or more volumes pairs being suspended from the replication session.

High availability control 114 updates secondary information (step 206). In this embodiment, high availability control 114 updates internal control block information for disk 112A utilizing currently online volumes with volume serial numbers (e.g., VOLSERs) which match the secondary volumes (i.e., disk 110A). High availability control 114 has the ability to determine if any errors occur in discovering the new secondary volumes (i.e., disk 112A) and report the discovered errors to an administrative user. When errors are discovered in the new secondary volumes, high availability control 114 can suspend the asynchronous minor to protect a consistent data point.

High availability control 114 determines if a lock was obtained (decision step 208). In the event high availability control 114 determines a lock was not obtained ("no" branch, step 208), high availability control 114 can allow for configuration changes to occur and operational steps for the modified control block information function end. In the event high availability control 114 determines a lock was obtained ("yes" branch, step 208), high availability control 114 releases the lock (step 210). By releasing the lock, high availability control 114 can allow for configuration changes to occur at the new secondary volume (i.e., disk 112A).

Subsequent to high availability control 114 performing the modified control block information function, high availability control 114 can perform a health checking function. High availability control can perform a query to discover synchronous minor relationships between two sets of secondary volumes (i.e., disk 110A and disk 112A) and can record the information in persistent storage. High availability control 114 can validate that for each piece of data on disk 110A there is a corresponding piece of data on disk 112A. High availability control 114 can identify any data inconsistences between disk 110A and disk 112, report the inconsistences, and suspend the minor if the relationship between disk 110A and disk 112A is invalid.

Figure 3:
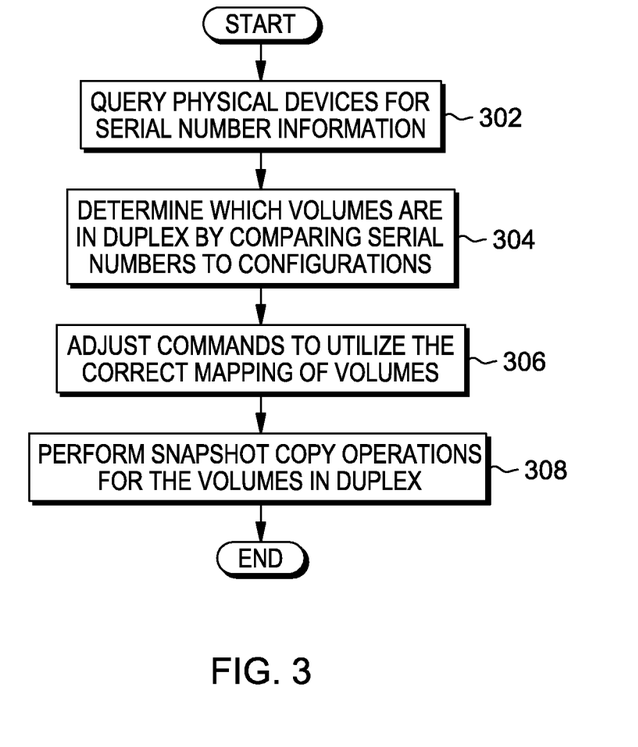
FIG. 3 is a flowchart depicting operational steps of a modified snapshot copy to perform the correct copy, depending on which set of secondary volumes is in duplex, in accordance with an embodiment of the present invention.

FIG. 3 is a flowchart depicting operational steps of a modified snapshot copy function to perform the correct copy depending on which set of secondary volumes is in duplex, in accordance with an embodiment of the present invention.

A disaster recovery environment includes protection functions, which typically perform a snapshot copy during three kinds of events. The three events are after a suspension of a replication session so that data for a particular point in time is maintained during the replication session resynchronization, before a disaster recovery test to create a copy of the data for the disaster recovery test while minoring continues, and during a disaster, before recovering data, so that the recovery environment runs the same way that disaster recovery testing runs. The snapshot copy function is aware that there are two possible sets of secondary volumes (i.e., disk 110A and disk 112A) and corresponding tertiary volumes (i.e., disk 110B and disk 112B). When a snapshot is utilized to preserve the point in time, the snapshot copy function has to be aware of which set of secondary and tertiary volumes represent the set currently in use and direct commands to the correct set of volumes.

Point-in-time copy control 118 queries physical devices for serial number information (step 302). In this embodiment, the serial numbers are volume serial numbers also known as VOLSERs. Point-in-time copy control 118 can utilize the serial numbers for the physical devices to determine which of the secondary volumes, disk 110A or disk 112A is in v at the disaster recovery site.

Point-in-time copy control 118 determines which volumes are in duplex by comparing serial numbers to configurations (step 304). Point-in-time copy control 118 matches the serial number information of the physical devices to a configuration of either disk 110A or disk 112A. Matching serial number information to a configuration represents which of the secondary volumes is in duplex in the replication session. Depending on which configuration matches the serial number information, point-in-time copy control 118 can determine for which secondary volume to perform a snapshot copy.

Point-in-time copy control 118 adjusts commands to utilize the correct mapping of volumes (step 306). If point-in-time copy control 118 determines that disk 110A is in duplex, then point-in-time copy control 118 adjusts commands to use the correct mapping of disk 110A to disk 110B (tertiary volume for disk 110A). If point-in-time copy control 118 determines that disk 112A is in duplex, then point-in-time copy control 118 adjusts commands to use the correct mapping of disk 112A to disk 112B (tertiary volume for disk 112A).

Point-in-time copy control 118 performs snapshot copy operations for the volumes in duplex (step 308). In one instance, point-in-time copy control 118 can perform a snapshot copy, such as a FlashCopy™ (i.e., point-in-time copy), of disk 110A prior to the secondary volume (i.e., disk 110A) being moved to a new technology, thus creating a copy of the data prior to a volume swap between disk 110A and disk 110B occurring. In another instance, point-in-time copy control 118 can perform the snapshot copy (i.e., point-in-time copy) of disk 112A subsequent to a swapping of volumes at the secondary site occurring during storage (i.e., disk 110A) issues at the secondary site.

Figure 4:
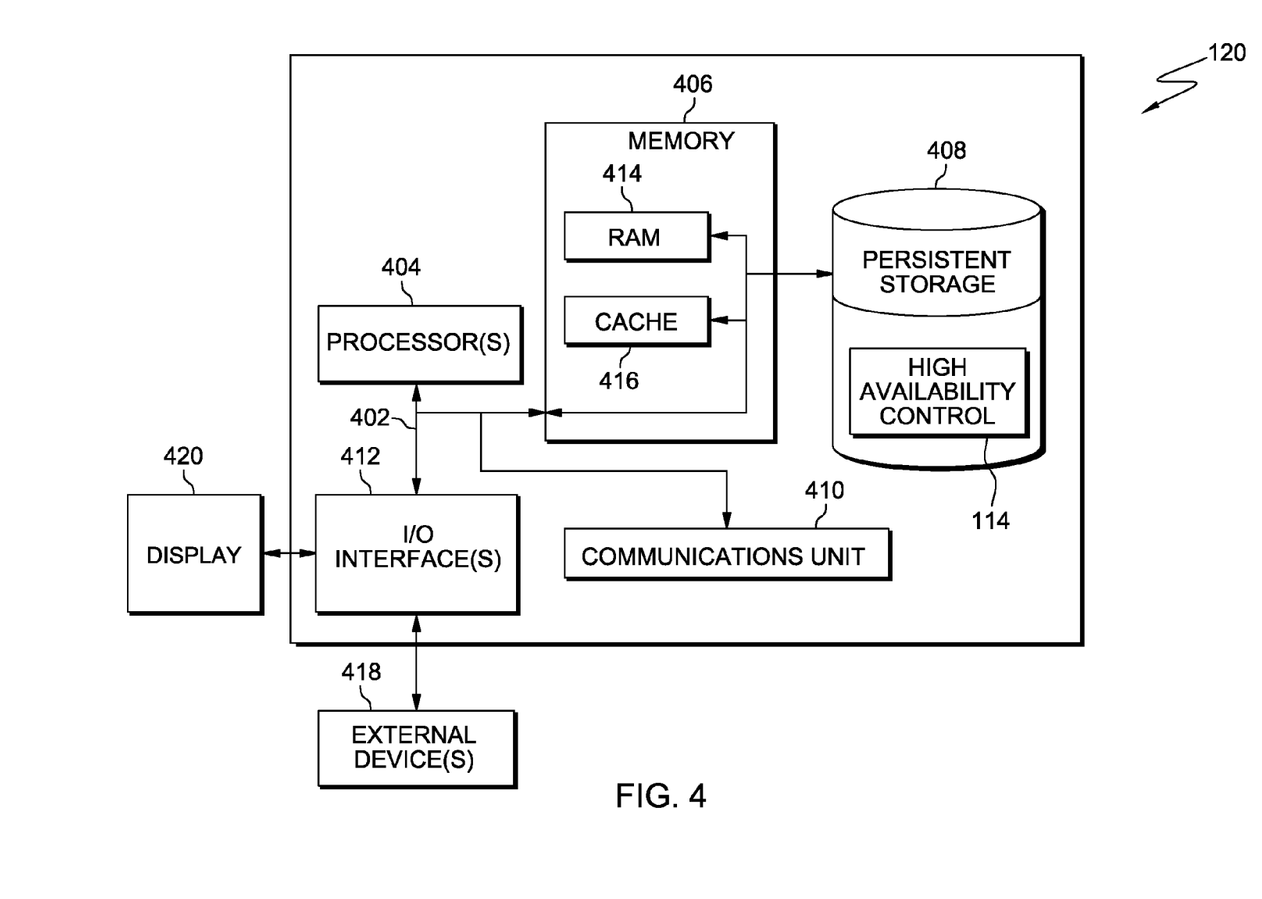
FIG. 4 is a block diagram of components of a computer system, such as the computer server of FIG. 1, in accordance with an embodiment of the present invention.

FIG. 4 depicts a block diagram of components of a computer hosting, such as server 120, hosting operating instructions of operating instructions of high availability control 114 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 120 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are examples of computer readable tangible storage devices. A storage device is any piece of hardware that is capable of storing information, such as, data, program code in functional form, and/or other suitable information on a temporary basis and/or permanent basis. In this embodiment, memory 406 includes random access memory (RAM) 414 and cache memory 416. In general, memory 406 can include any suitable volatile or non-volatile computer readable storage device.

High availability control 114 is stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 308.

Communications unit 410, in these examples, provides for communications with other data processing systems or devices, including systems and devices within or controlled by server 120. In these examples, communications unit 410 includes one or more wireless network interface cards. Communications unit 410 may provide communications through the use of either or both physical and wireless communications links. Computer programs and processes, such as high availability control 114, may be downloaded to persistent storage 408 through communications unit 410, or uploaded to another system through communications unit 410.

I/O interface(s) 412 allows for input and output of data with other devices that may be connected to server 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 may also connect to a display 420. Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a modified asynchronous replication session, the method comprising:

acquiring, by one or more processors, a lock on a volume configuration, wherein the lock prevents changes to the volume configuration between a first volume and a second volume at a remote site;

updating, by one or more processors, internal control block information, wherein the update includes at least a volume serial number of the first volume matching a volume serial number of the second volume;

responsive to updating internal control block information, releasing, by one or more processors, the acquired lock to allow changes to the volume configuration;

performing, by one or more processors, a query to discover a synchronous relationship between the first volume and the second volume;

determining, by one or more processors, if data in the first volume includes corresponding data in the second volume; and responsive to determining a portion of data in the first volume does not include a corresponding portion of data in the second volume, suspending, by one or more processors, the synchronous relationship between the first volume and the second volume.

2. The method of claim 1, further comprising:

prior to acquiring a lock on a volume configuration, halting, by one or more processors, application updates and an asynchronous mirror between a third volume at a local site and the first volume at the remote site;

switching, by one or more processors, one or more hosting unit control blocks to point to the second volume at the remote site; and resuming, by one or more processors, application updates.

3. The method of claim 2, further comprising:

querying, by one or more processors, for volume serial number information of the third volume;

determining, by one or more processors, the volume serial number information of the third volume matches a configuration of the first volume;

adjusting, by one or more processors, one or more commands to map the first volume with a tertiary volume of the first volume; and performing, by one or more processors, a point-in-time copy of the first volume.

4. The method of claim 2, further comprising:

querying, by one or more processors, for volume serial number information of the third volume;

determining, by one or more processors, the volume serial number information of the third volume matches a configuration of the second volume;

adjusting, by one or more processors, one or more commands to map the second volume with a tertiary volume of the second volume; and performing, by one or more processors, a point-in-time copy of the second volume.

5. A computer program product for a modified asynchronous replication session, the computer program product comprising:

one or more computer readable tangible storage media and program instructions stored on at least one of the one or more storage media, the program instructions executable by a processor, to cause the processor to:

acquire a lock on a volume configuration, wherein the lock prevents changes to the volume configuration between a first volume and a second volume at a remote site;

update internal control block information, wherein the update includes at least a volume serial number of the first volume matching a volume serial number of the second volume;

responsive to updating internal control block information, release the acquired lock to allow changes to the volume configuration perform a query to discover a synchronous relationship between the first volume and the second volume;

determine if data in the first volume includes corresponding data in the second volume; and responsive to determining a portion of data in the first volume does not include a corresponding portion of data in the second volume, suspend the synchronous relationship between the first volume and the second volume.

6. The computer program product of claim 5, further comprising program instructions, stored on the one or more computer readable storage media, which when executed by a processor, cause the processor to:

prior to acquiring a lock on a volume configuration, halt application updates and an asynchronous mirror between a third volume at a local site and the first volume at the remote site;

switch one or more hosting unit control blocks to point to the second volume at the remote site; and resume application updates.

7. The computer program product of claim 6, further comprising program instructions, stored on the one or more computer readable storage media, which when executed by a processor, cause the processor to:

query for volume serial number information of the third volume;

determine the volume serial number information of the third volume matches a configuration of the first volume;

adjust one or more commands to map the first volume with a tertiary volume of the first volume; and perform a point-in-time copy of the first volume.

8. The computer program product of claim 6, further comprising program instructions, stored on the one or more computer readable storage media, which when executed by a processor, cause the processor to:

query for volume serial number information of the third volume;

determine the volume serial number information of the third volume matches a configuration of the second volume;

adjust one or more commands to map the second volume with a tertiary volume of the second volume; and perform a point-in-time copy of the second volume.

9. A computer system for a modified asynchronous replication session, the computer system comprising:

one or more computer processors;

one or more computer readable storage media; and program instructions stored on the computer readable storage media for execution by at least one of the one or more computer processors, the program instructions comprising:

program instructions to acquire a lock on a volume configuration, wherein the lock prevents changes to the volume configuration between a first volume and a second volume at a remote site;

program instructions to update internal control block information, wherein the update includes at least a volume serial number of the first volume matching a volume serial number of the second volume;

program instructions to, responsive to updating internal control block information, release the acquired lock to allow changes to the volume configuration
program instructions to perform a query to discover a synchronous relationship between the first volume and the second volume;
program instructions to determine if data in the first volume includes corresponding data in the second volume; and
program instructions to, responsive to determining a portion of data in the first volume does not include a corresponding portion of data in the second volume, suspend the synchronous relationship between the first volume and the second volume.

10. The computer system of claim 9, further comprising program instructions, stored on the one or more computer readable storage media, which when executed by a processor, cause the processor to:
prior to acquiring a lock on a volume configuration, halt application updates and an asynchronous mirror between a third volume at a local site and the first volume at the remote site;
switch one or more hosting unit control blocks to point to the second volume at the remote site; and
resume application updates.

11. The computer system of claim 10, further comprising program instructions, stored on the one or more computer readable storage media, which when executed by a processor, cause the processor to:
query for volume serial number information of the third volume;
determine the volume serial number information of the third volume matches a configuration of the first volume;
adjust one or more commands to map the first volume with a tertiary volume of the first volume; and
perform a point-in-time copy of the first volume.

12. The computer system of claim 10, further comprising program instructions, stored on the one or more computer readable storage media, which when executed by a processor, cause the processor to:
query for volume serial number information of the third volume;
determine the volume serial number information of the third volume matches a configuration of the second volume;
adjust one or more commands to map the second volume with a tertiary volume of the second volume; and
perform a point-in-time copy of the second volume.

* * * * *